United States Patent
Verseux et al.

(10) Patent No.: US 9,017,021 B2
(45) Date of Patent: Apr. 28, 2015

(54) AEROENGINE FAN CASING MADE OF COMPOSITE MATERIAL, AND A METHOD OF FABRICATING IT

(75) Inventors: Philippe Verseux, Draveil (FR); Regis Eugene Henri Servant, Vigneux sur Seine (FR)

(73) Assignee: Snecma, Paris (FR)

( * ) Notice: Subject to any disclaimer, the term of this patent is extended or adjusted under 35 U.S.C. 154(b) by 771 days.

(21) Appl. No.: 13/277,705

(22) Filed: Oct. 20, 2011

(65) Prior Publication Data

US 2012/0099981 A1 Apr. 26, 2012

(30) Foreign Application Priority Data

Oct. 22, 2010 (FR) ...................................... 10 58658

(51) Int. Cl.
*F01D 25/24* (2006.01)
*F02C 7/32* (2006.01)
*F01D 21/04* (2006.01)

(52) U.S. Cl.
CPC ................ *F02C 7/32* (2013.01); *F01D 21/045* (2013.01); *Y02T 50/672* (2013.01); *F05D 2300/603* (2013.01)

(58) Field of Classification Search
USPC ...................... 415/9, 108, 200, 201
See application file for complete search history.

(56) References Cited

U.S. PATENT DOCUMENTS

| 2006/0093847 | A1 | 5/2006 | Hornick et al. |
| 2006/0201135 | A1 | 9/2006 | Xie et al. |
| 2007/0081887 | A1 | 4/2007 | Xie |
| 2008/0118683 | A1 | 5/2008 | Xie |
| 2008/0128073 | A1* | 6/2008 | Xie et al. ........................ 156/172 |
| 2008/0206048 | A1 | 8/2008 | Coupe et al. |
| 2011/0085897 | A1 | 4/2011 | Vauchel et al. |

FOREIGN PATENT DOCUMENTS

| EP | 1 674 671 | A2 | 6/2006 |
| EP | 1 927 732 | A2 | 6/2008 |
| EP | 1 961 923 | A2 | 8/2008 |
| WO | WO 2009/147307 | A1 | 12/2009 |

OTHER PUBLICATIONS

French Preliminary Search Report issued Jun. 22, 2011, in French 10 58658, filed Oct. 10, 2010 (with English Translation of Category of Cited Documents).

* cited by examiner

*Primary Examiner* — Richard Edgar
(74) *Attorney, Agent, or Firm* — Oblon, McClelland, Maier & Neustadt, L.L.P.

(57) ABSTRACT

An aeroengine fan casing is made of composite material including fiber reinforcement densified by a matrix. The casing is secured to at least one ring or ring sector that is situated on the inside face of the casing and that is mechanically connected to an equipment fastener part that is situated on the outside face of the casing, in particular for fastening an accessory gearbox.

3 Claims, 2 Drawing Sheets

AEROENGINE FAN CASING MADE OF COMPOSITE MATERIAL, AND A METHOD OF FABRICATING IT

BACKGROUND OF THE INVENTION

The invention relates to a gas turbine aeroengine fan casing, and more particularly to a fan casing made of composite material comprising fiber reinforcement densified by a matrix.

In a gas turbine aeroengine, the fan casing performs several functions. It provides aerodynamic continuity for the secondary stream through the engine, it supports an abradable material facing the tips of the fan blades, it supports a structure that is generally in the form of acoustic panels in order to attenuate soundwaves at the inlet of the engine, and it incorporates or supports a shield for retaining debris projected against the inside face of the casing, such as ingested foreign bodies or damaged blade debris.

Proposals have already been made to make a fan casing out of composite material. Document US 2008/206048, the content of which is incorporated herein by reference, describes a method comprising making a fiber preform for the casing by taking layers of a fiber texture obtained by three-dimensional weaving and presenting varying thickness, by winding the layers in superposition onto a former, and then by densifying the preform with a matrix, typically a polymer matrix. The use of a woven texture that presents varying thickness makes it possible to incorporate the retention shield merely by a localized increase in thickness.

Such a composite material fan casing can perform the functions of supporting abradable material and of supporting acoustic panels. Nevertheless, mounting pieces of equipment on the casing can give rise to difficulty, particularly when the pieces of equipment are heavy and/or subjected to particular forces. A typical example of such a piece of equipment is the accessory gearbox (AGB) that contains gearing mechanically coupled to one of the shafts of the turbine and that has various rotary members mounted thereon (such as starter-generators, pumps, alternators, . . . ). In particular for reasons of compactness, it may be necessary or desirable to mount the AGB on the fan casing. With a metal casing, that is typically achieved by fastening metal fittings on ribs positioned on the outside face of the casing, with the housing of the AGB being mounted on the fittings. That solution is difficult or impossible to transpose to a fan casing that is made of composite material because of the high risk of severely damaging the composite material under the effect of the weight of the AGB and the members that it carries, and under the effect of the forces to which the AGB may be subjected in the event of exceptional loads being applied to the structure of the engine, in particular in the event of a fan blade breaking.

One solution might consist in reducing the axial dimension, or length, of the casing that is made of composite material and in increasing correspondingly the length of the outer shroud of an intermediate metal casing that extends the fan casing from its downstream end, so as to make it possible to fasten the AGB mounting fittings on the intermediate casing. Nevertheless, the weight advantage of a fan casing that is made of a composite material compared with a fan casing that is made of metal would be significantly reduced thereby.

Another solution as proposed in document US 2011/0085897 consists in surrounding the fan casing made of a composite material with a collar that carries the equipment fastener parts. The collar is fastened to the outside surface of the casing by adhesive. The forces, in particular shear or traction forces, that are generated in service by the presence of the equipment are thus transmitted to the casing with a high risk of the composite material of the casing being damaged.

OBJECT AND SUMMARY OF THE INVENTION

An object of the invention is to enable pieces of equipment, in particular relatively heavy pieces of equipment, to be fastened on an aeroengine fan casing when the casing is made of a composite material comprising fiber reinforcement densified by a matrix, while avoiding the above-mentioned drawbacks.

This object is achieved by the fact that the casing is secured to at least one ring or ring sector that is situated on the inside face of the casing and that is mechanically connected through the casing to at least one equipment fastener part that is situated on the outside face of the casing.

Thus, the composite material casing is held between the ring or ring sector and one or more equipment fastener parts, and it is less exposed to any risk of damage by the forces exerted on the fastener part(s).

The ring or ring sector may be made of metal or of a composite material having fiber reinforcement densified by a matrix.

An object of the invention is also to provide a method of fabricating such a casing, the method comprising making a fiber preform for the casing; and densifying the fiber preform while shaped by means of a mold, densification comprising impregnating the preform with a liquid composition that is a precursor of the matrix of the composite material, and obtaining the matrix by transforming the precursor;

in which method the ring or ring sector is incorporated in the casing during the shaping and densification operations.

In one implementation of the method, the ring or ring sector is prefabricated and is put into place in the mold so as to be adjacent to the casing preform prior to impregnation.

In another implementation of the method, a fiber structure forming the fiber reinforcement of a ring or a ring sector made of composite material is put into place in the mold so as to be adjacent to the casing preform, and said fiber structure and the casing preform are co-densified.

The invention also provides a gas turbine aeroengine including a composite material fan casing as defined above together with at least one piece of equipment mounted on the fan casing, the piece of equipment being selected in particular from an accessory gearbox, an electronic control unit for the engine, and a tank.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS OF THE INVENTION

The invention is described below with reference to its application to a turbomachine fan casing for an aeroengine.

Figure 1:
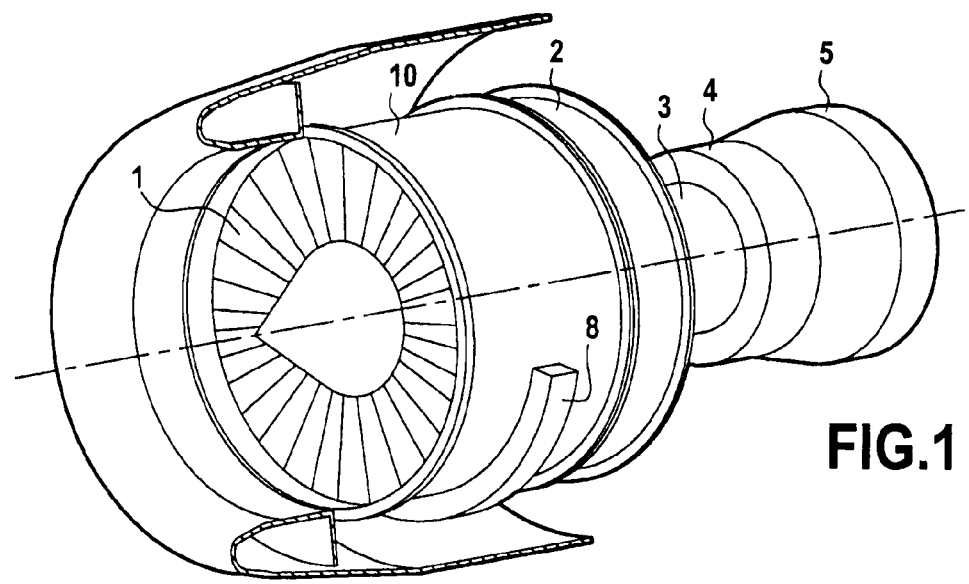
FIG. 1 is a very diagrammatic view of a gas turbine aeroengine.

As shown diagrammatically in FIG. 1, such a turbomachine comprises, from upstream to downstream in the flow direction of the gas stream: a fan 1 located at the inlet of the turbomachine; a compressor 2; a combustion chamber 3; a high-pressure (HP) turbine 4; and a low-pressure (LP) turbine 5. The turbines 4 and 5 are coupled respectively to the compressor 2 and to the fan 1 via coaxial HP and LP shafts (not shown). The turbomachine is housed in a casing comprising a plurality of portions corresponding to different ones of its elements. Thus, the fan 1 is surrounded by a fan casing 10 that carries various pieces of equipment on its outside face, in particular an AGB 8 that is mechanically connected to a shaft of the turbine.

Figure 2:
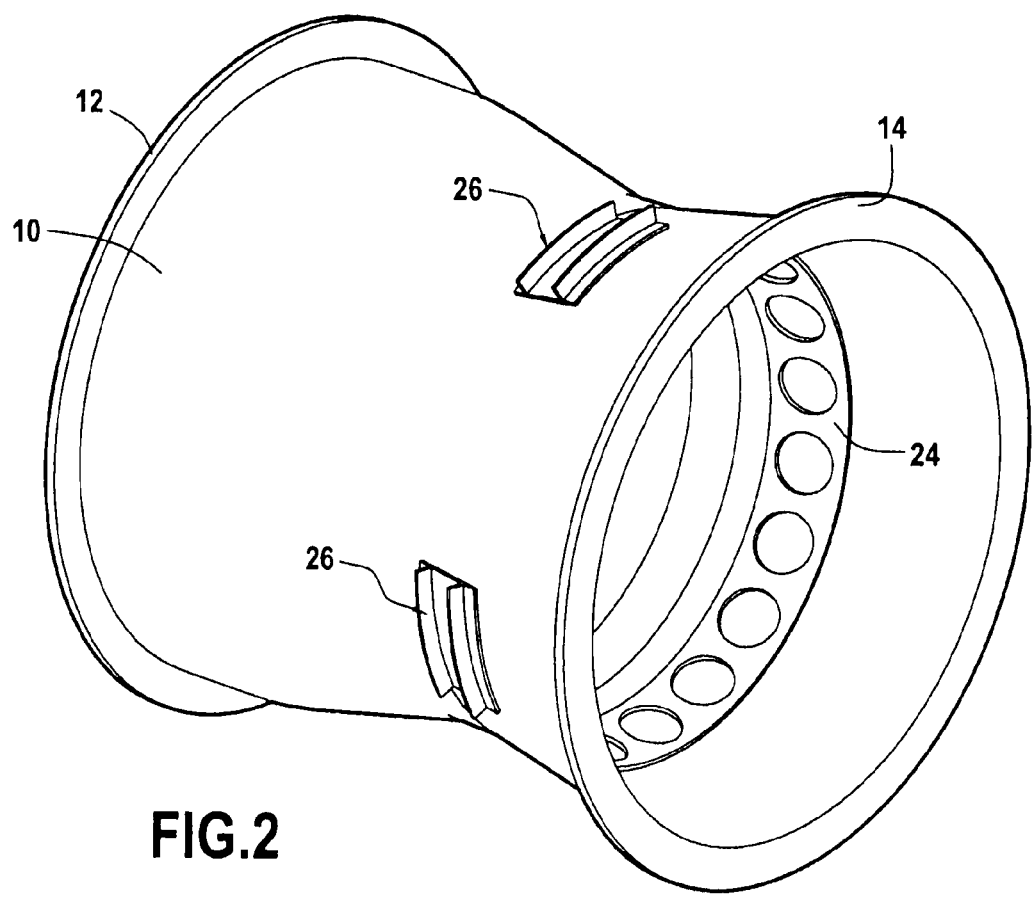
FIG. 2 is a diagrammatic perspective view of an assembly constituted by a fan casing in accordance with the invention and an intermediate casing extending the fan casing downstream.
Figure 3:
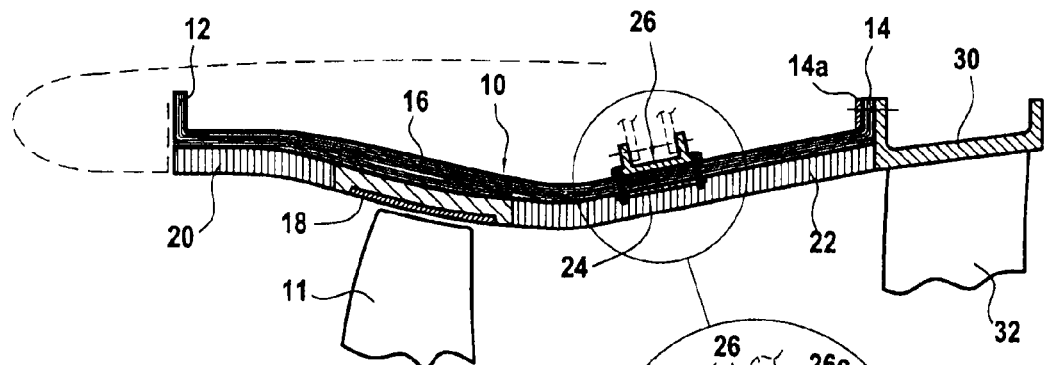
FIG. 3 is a diagrammatic half-view in axial section on a larger scale of the assembly shown in FIG. 2.

FIGS. 2 and 3 show a fan casing 10 in accordance with the invention. The casing 10 is extended downstream by an intermediate casing 30 (shown only in FIG. 3) having connected thereto arms 32 for supporting the high-pressure body of the turbomachine.

The fan casing 10 is made of composite material comprising fiber reinforcement densified by a matrix. The fiber reinforcement may for example be made of carbon, glass, aramid, or ceramic fibers. The matrix is typically a polymer matrix, e.g. made of epoxy, bismaleimide, or polyimide.

Advantageously, the casing 10 is made as a single piece with flanges 12 and 14 at its axial ends. The upstream flange 12 is used for fastening an air inlet sleeve (not shown). The downstream flange 14 is used for connecting with the intermediate casing 30 by means of connection members, e.g. of the nut-and-bolt type, with an annular backing plate 14a being interposed, being applied to the upstream face of the flange 14. The intermediate casing 30 is made of metal, e.g. of titanium or a titanium-based metal alloy, or indeed of aluminum, as is the backing plate 14a.

In its portion situated facing the tips of the fan blades 11, the casing 10 presents extra thickness forming a shield 16 for retaining debris coming from ingested foreign bodies or fragments of damaged blades. Also in its portion situated facing the tips of the blades 11, the casing 10 is provided on its inside face with an abradable coating 18 that may be made up of juxtaposed panels fastened to the casing 10 and provided with an abradable material, e.g. as described in document US 2010/329843.

On its inside face, the casing 10 is also provided with a soundproofing coating, upstream and/or downstream from the abradable coating 18. In the example shown, the soundproofing coating is made up of a first set of acoustic panels 20 located between the upstream end of the casing 10 and the abradable coating 18, and by a second set of acoustic panels 22 located between the abradable coating 18 and the downstream end of the casing 10, the inside surfaces of the acoustic panels and of the abradable coating defining the air flow duct inside the fan casing. Each set of acoustic panels comprises a plurality of juxtaposed panels, each extending over a sector of the inside surface of the casing 10. As is well known, the panels 20, 22 may be formed by a cellular structure arranged between an outer skin applied against the inside face of the casing and a multiply-perforated outer skin, the cells having walls that extend substantially radially between the skins. By way of example, reference may be made to document U.S. Pat. No. 4,858,721.

The panels of the abradable and acoustic coatings may be fastened to the casing 10 in known manner by means of screws and of inserts incorporated in the panels.

At least one annular ring 24 is fastened to the inside face of the casing 10. In the example shown, the ring 24 extends over the entire periphery of the inside face of the casing 10 behind the set of acoustic panels 22. The ring 24 is connected to fastener parts 26 for fastening pieces of equipment to the outside face of the casing. By way of example, the parts 26 comprise fittings for mounting the AGB (not shown in FIG. 2). Each of the parts 26 has a soleplate 26a from which there project ribs 26b, 26c on which the AGB 8 is fastened. Each part 26 is mechanically connected to the ring 24 by connection members such as nut-and-bolt systems 28 that pass through the casing and that bear firstly against the inside face of the ring 24 and secondly against the soleplate 26a, away from the ribs 26b and 26c.

The ring 24 may be used for holding one or more fastener parts on the outside face of the casing 10 for use in fastening equipment other than the AGB 8, and in particular relatively heavy equipment such as a tank or an engine control unit (ECU).

The composite material of the casing 10 is clamped between the ring 24 and each fastener part 26, so damage to the composite material is avoided in spite of the weight of the equipment that is supported or the forces to which said equipment is subjected.

Naturally, the ring 24 could be used for holding fastener parts for several different pieces of equipment.

The ring 24 is preferably situated at the level of a set of acoustic panels rather than at the level of the abradable coating. The shape of the outer skins of the acoustic panels is adapted for this purpose. The presence of the connection members 28 does not significantly affect the performance of the acoustic panels.

The ring 24 may be made of metal, e.g. of titanium, of a titanium-based alloy, or indeed of aluminum. If it is made of aluminum, a galvanic insulation layer, e.g. made of glass fibers, is preferably interposed between the ring 24 and the composite material of the casing. The metal ring 24 is preferably perforated, as can be seen in FIG. 2, in order to reduce its weight. In a variant, the ring 24 may be made of composite material comprising fiber reinforcement densified by a matrix, e.g. carbon or ceramic fiber reinforcement densified by a polymer matrix or a carbon matrix. The ring 24 may be a single piece or it may be made up of a plurality of touching or quasi-touching sectors so as to occupy 360°, i.e. the entire periphery of the inside face of the casing 10. The use of a ring sector extending over only a fraction of the periphery could also be envisaged.

The ring 24 is preferably incorporated in the casing 10 during fabrication thereof.

Fabricating the casing 10 out of composite material comprises making a fiber preform for the casing and densifying it with the matrix of the composite material.

In order to make the fiber preform of the casing 10, it is possible to proceed in the manner described in the above-mentioned document US 2008/206048.

Figure 4:
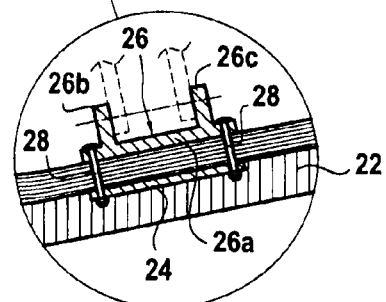
FIG. 4 is a diagrammatic half-view in axial section showing a fan casing preform being shaped on tooling in order to make a fan casing in an implementation of the invention.
Figure 4:
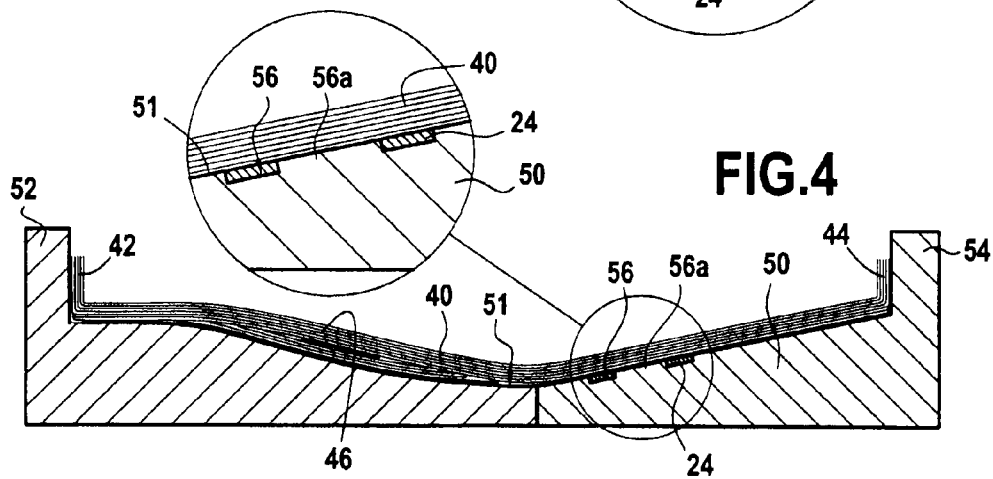

A woven fiber texture is obtained by multilayer or three-dimensional weaving, and it is wound in overlapping turns on a mold 50 forming a winding mandrel (FIG. 4). The mold 50 presents an outside surface 51 or profile that corresponds to the profile of the inside face of the casing that is to be made, together with two end plates 52, 54. An annular housing 56 is formed in the outside surface 51 of the mold in order to receive the ring 24 prefabricated out of metal or of composite material.

After the ring 24 has been put into place on the mold 50, the fiber texture is wound as superposed turns so as to obtain the fiber preform 40 of the casing. The fiber texture matches the profile of the mold 50 and its edges are raised so as to form preform portions 42, 44 corresponding to the flanges 12, 14.

As mentioned above, a galvanic isolation layer, e.g. made of glass fibers, may be put into place on the ring 24 before winding the fiber texture that forms the fiber preform of the casing.

The fiber texture may be woven with a weave of the interlock type and with thickness that varies so as to form a preform portion 46 that is thicker at the location of the retention shield. Greater thickness may be obtained by localized addition of layers of warp yarns and/or of weft yarns. In addition, during weaving, the warp yarns are taken from a drum of diameter that increases progressively in its axial end portions in order to make it possible subsequently to shape flange portions 42, 44 of the preform.

In a variant, the fiber preform of the casing may be obtained by winding superposed turns of a woven fiber texture of constant thickness, with a preform portion of greater thickness being obtained by localized extra winding.

Still in a variant, the preform portions corresponding to the flanges of the casing may be made separately and assembled with the remainder of the preform, e.g. by stitching.

After the fiber preform of the casing has been made, it is held in shape by means of a backing mold or by means of a flexible envelope (not shown) that is applied against its outside surface. It is then impregnated with a resin that is a precursor of the matrix of the composite material and then the resin is polymerized. After unmolding, the casing may be machined to have its final dimensions.

With a perforated ring 24 as shown in FIG. 2, the annular housing 56 of the mold 50 may present portions in relief 56a (see the detail of FIG. 4) penetrating into the perforations of the ring 24 in order to prevent them being filled by the impregnation resin. The mold 40 is made up of a plurality of portions so as to enable the ring 24 to be put into place, which may be sectorized, and also to enable subsequent unmolding.

Polymerizing the resin provides sufficient adhesion to ensure that the ring 24 is kept in position.

Figure 5:
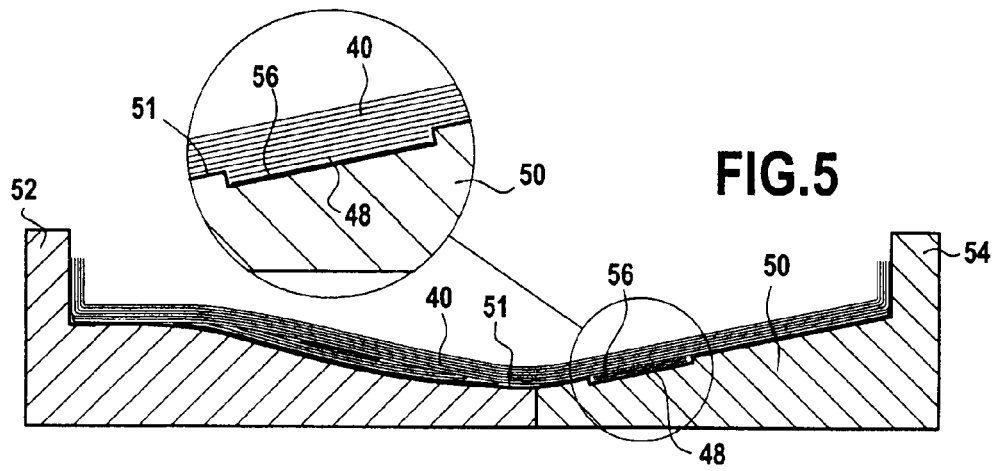
FIG. 5 is a diagrammatic half-view in axial section showing a fan casing preform shaped on tooling in order to make a fan casing in another implementation of the invention.

FIG. 5 shows a variant implementation in which fiber reinforcement 48, e.g. in the form of a woven strip wound to form one or more layers, is put into place in the housing 56 of the mold 50, with the housing 56 not having any portions in relief.

The preform 40 and the fiber reinforcement 48 are impregnated with the same resin and thus are co-densified in order to obtain a ring of composite material that is made integrally with the casing.

Above, the use of a single ring is described for the purpose of securing one or more equipment fastener parts.

In a variant, it is possible to have a plurality of rings in order to secure fastener parts for different pieces of equipment at different levels along the casing in the axial direction.

Naturally, fastener parts for pieces of equipment other than those described above could be mounted on the casing 10 in this way, e.g. fastener parts for harnesses or for pipework.

The invention claimed is:

1. A method of fabricating a turbine casing made of composite material having fiber reinforcement densified by a matrix, the casing being secured to at least one ring or ring sector that is situated on an inside face of the casing and that is mechanically connected through the casing to at least one equipment fastener part situated on the outside face of the casing, the method comprising:
   making a fiber preform for the casing; and
   densifying the fiber preform and shaping the fiber preform by a mold, the densifying comprising
      impregnating the preform with a liquid composition that is a precursor of the matrix of the composite material, and
      obtaining the matrix by transforming the precursor,
   wherein the ring or ring sector is incorporated in the casing during the shaping and densifying the fiber preform.

2. A method according to claim 1, wherein the ring or ring sector is prefabricated and is put into place in the mold so as to be adjacent to the casing preform prior to impregnation.

3. A method according to claim 1, wherein a fiber structure forming the fiber reinforcement of a ring or a ring sector made of composite material is put into place in the mold so as to be adjacent to the casing preform, and said fiber structure and the casing preform are co-densified.

* * * * *